(12) United States Patent
Noma

(10) Patent No.: US 7,154,717 B2
(45) Date of Patent: Dec. 26, 2006

(54) MAGNETORESISTANCE EFFECT FILM, MAGNETORESISTANCE EFFECT HEAD AND SOLID STATE MEMORY

(75) Inventor: Kenji Noma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 475 days.

(21) Appl. No.: 10/773,902

(22) Filed: Feb. 6, 2004

(65) Prior Publication Data

US 2005/0047029 A1 Mar. 3, 2005

(30) Foreign Application Priority Data

Sep. 3, 2003 (JP) ............................. 2003-310946

(51) Int. Cl.
*G11B 5/33* (2006.01)
(52) U.S. Cl. .................................................. 360/327.1
(58) Field of Classification Search ............. 360/327.1, 360/324.1, 324.2, 323; 438/3
See application file for complete search history.

(56) References Cited

U.S. PATENT DOCUMENTS

| | | | |
|---|---|---|---|
| 6,222,707 B1 | 4/2001 | Huai et al. | |
| 6,724,585 B1 * | 4/2004 | Hayashi | 360/324.2 |
| 7,038,890 B1 * | 5/2006 | Pinarbasi | 360/324.1 |
| 2003/0133232 A1 | 7/2003 | Li et al. | |
| 2003/0146459 A1 | 8/2003 | Katti et al. | |
| 2006/0007605 A1 * | 1/2006 | Li et al. | 360/324.1 |
| 2006/0057745 A1 * | 3/2006 | Horng et al. | 438/3 |

FOREIGN PATENT DOCUMENTS

| | | |
|---|---|---|
| JP | 07-169026 | 7/1995 |
| JP | 11-185219 | 7/1999 |

* cited by examiner

*Primary Examiner*—Tianjie Chen
(74) *Attorney, Agent, or Firm*—Greer, Burns & Crain, Ltd.

(57) ABSTRACT

The magnetoresistance effect film is capable of performing enough function without employing an antiferromagnetic layer. The film comprises: a seed layer; a first pinned magnetic layer formed on the seed layer; an antiferromagnetically coupling layer formed on the first pinned magnetic layer; a second pinned magnetic layer formed on the antiferromagnetically coupling layer; a nonmagnetic layer formed on the second pinned magnetic layer; a free magnetic layer formed on the nonmagnetic layer; and a protection layer formed on the free magnetic layer. The seed layer fixes magnetizing directions of the first and the second pinned magnetic layer. The seed layer is made of a material which does not exchange-couple with the first pinned magnetic layer.

12 Claims, 7 Drawing Sheets

| PROTECTION LAYER |
| FREE MAGNETIC LAYER |
| NON MAGNETIC LAYER |
| SECOND PINNED MAGNETIC LAYER |
| ANTI FERRO MAGNETICALLY COUPLING LAYER |
| FIRST PINNED MAGNETIC LAYER |
| SEED LAYER |

SEED LAYER: NONE
MR-ratio 5.16 %
Δρ/t 1.39 Ω
ρ/t 26.9 Ω

SEED LAYER: Cu
MR-ratio 0.05 %
Δρ/t 0.01 Ω
ρ/t 25.8 Ω

US 7,154,717 B2

MAGNETORESISTANCE EFFECT FILM, MAGNETORESISTANCE EFFECT HEAD AND SOLID STATE MEMORY

BACKGROUND OF THE INVENTION

The present invention relates to a magnetoresistance effect film, a magnetoresistance effect head using said film, and a solid state memory using said film.

Recording density of hard disks have been increased 100% every year. To continuously increase the recording density, resolution of a reproducing head, which is assembled in a hard disk drive unit, in a direction of gap-length, must be improved, and a width of a magnetoresistance effect element of the reproducing head in a direction of track width must be narrower. Thus, in a conventional reproducing head, the resolution is improved by making the gap-length short, and the width of the element is made narrower.

Magnetoresistance effect films are shown in FIGS. 10 and 11. Two types of magnetoresistance effect elements are used for reproducing heads of hard disk drive units. One is a CIP (Current In-Plane) type, in which a sensing current passes in a plane of a magnetoresistance effect film (see FIG. 10); the other is a CPP (Current Perpendicular to Plane) type, in which a sensing current passes perpendicular to a plane of a magnetoresistance effect film (see FIG. 11).

In the magnetoresistance effect head shown in FIG. 10, the magnetoresistance effect film 10 is sandwiched between a lower insulating layer 12 and an upper insulating layer 14, further they are sandwiched between a lower shielding layer 16 and an upper shielding layer 18. The magnetoresistance effect head has biasing layers 22 and terminal layers 24.

On the other hand, in the magnetoresistance effect head shown in FIG. 11, the magnetoresistance effect film 10 is sandwiched between the lower shielding layer 16 and the upper shielding layer 18. The magnetoresistance effect head has insulating layers 20 and the biasing layers 22.

The gap-length relating to the resolution of reproducing signals is defined as a distance of the narrowest gap between the lower shielding layer and the upper shielding layer, which sandwich the magnetoresistance effect element. In the CIP type head, the gap is the sum of thickness of the lower shielding layer, the magnetoresistance effect film and the upper shielding layer; in the CPP type head, the gap is thickness of the magnetoresistance effect film including the terminal layers. The narrower the gap-length is made, the more the resolution of the reproducing head is improved. Therefore, the thickness of the magnetoresistance effect film has been made thinner so as to improve the resolution of the reproducing head.

Effectively reducing the width of the magnetoresistance effect element with reducing the thickness of the magnetoresistance effect film will be explained.

A method of manufacturing the CIP type head is shown in FIGS. 12A–12F. Note that, the CPP type head is manufactured by similar method. Firstly, the lower shielding layer 16 and the lower insulating layer 12 are formed, then a magnetoresistance effect film 30 is formed on the lower insulating layer 12 by sputtering (see FIG. 12A). Next, a resist pattern 32, which defines the width of the magnetoresistance effect element, is formed by photolithography (see FIG. 12B). The width of the resist pattern 32 is, for example, 0.05–0.2 μm.

Successively, the magnetoresistance effect film 30 is etched by ion beams (see FIG. 12C). At that time, the resist pattern 32 acts as a mask. Parts of the magnetoresistance effect film 30 which are not covered with the resist pattern 32 are sputter-etched by ion beams, a part of sputtered atoms stick on side walls of the resist pattern 32. For example, in the case of the magnetoresistance effect film 30 having effect thickness of 38 nm, thickness of the stuck atoms is 16–28 nm. The more the magnetoresistance effect film 30 is etched, the thicker the thickness of the stuck atoms becomes. Therefore, if the thickness of the magnetoresistance effect film 30 is thin, the thickness of the stuck atoms can be thin.

After the etching step, a hard film, which controls magnetic zones of the magnetoresistance effect film 30, and a sputtered film 34, which will be terminals for supplying an electric current, are formed (see FIG. 12D), then disused parts are removed together with the resist (see FIG. 12E). Finally, the upper insulating layer 14 and the upper shielding layer 18 are formed (see FIG. 12F).

In the step shown in FIG. 12D, if the thickness of the sputtered film 34 is too thick, distances from the hard film and the terminals to the magnetoresistance effect element are long, so that the total width of the element must be greater. For example, in the case of the magnetoresistance effect film 30 having the effect thickness of 38 nm, the thickness of the stuck atoms on one side is 16–28 nm. Therefore, the width of the element must be added 0.032–0.056 nm. Since width of conventional elements are 0.1–0.2, the additional width is great. To effectively prevent forming the wider element, the total thickness of the magnetoresistance effect film 30 should be thinner.

A method of manufacturing a CIP type head with a thin magnetoresistance effect film, whose thickness is thinner than that of the magnetoresistance effect film used in the method shown in FIGS. 12A–12F, is shown in FIGS. 13A–13F.

If the total thickness of the magnetoresistance effect film is thin, the thickness of the stuck layer formed in the etching step shown in FIG. 13C is mostly in proportion to the total thickness of the magnetoresistance effect film 10. For example, in the case of magnetoresistance effect film 10 whose thickness is reduced from 34.6 nm to 19.6 nm, the thickness of the stuck layer can be reduced from 16–28 nm to 9–16 nm. Therefore, width of a core shown in FIG. 13E can be reduced 38 nm or less. Width of the resist pattern is 50–200 nm, so the reducible width is an important factor for reducing the width of the core. Further, if the magnetoresistance effect film is made thinner, the gap-length is also made shorter. For example, if the thickness of the insulating layers 12 and 14 are 18 nm, the gap-length of the reproducing head shown in FIG. 12F is 70.6 nm; on the other hand, the gap-length of the reproducing head shown in FIG. 13F is 55.6 nm. Namely, the gap-length can be shorter 22% with the thin magnetoresistance effect film.

As described above, the thin magnetoresistance effect film is capable of reducing the width of the core and the gap-length. Conventionally, an antiferromagnetic film about 10–15 nm thick is used to fix a magnetizing direction of a pinned magnetic layer in the magnetoresistance effect film, so it is difficult to make the total thickness of the magnetoresistance effect film 30 nm or less. A constitution of an ordinary magnetoresistance effect film of the CIP head is, for example, NiCr 5.0 nm/PtMn 13.0 nm/CoFe 1.5 nm/Ru 0.8 nm/CoFe 2.3 nm/Cu 2.0 nm/CoFe 1.0 nm/NiFe 3.0 nm/Ru 1.0 nm/Ta 5.0 nm. Therefore, the total thickness is 34.6 nm. On the other hand, a constitution of an ordinary magnetoresistance effect film of the CPP head is, for example, NiCr 5.0 nm/PtMn 13.0 nm/CoFe 1.5 nm/Ru 0.8 nm/CoFe 2.3 nm/Cu 2.0 nm/CoFe 1.0 nm/NiFe 2.0 nm/CoFe 1.0 nm/Cu 2.0 nm/CoFe 2.3 nm/Ru 0.8 nm/CoFe 2.0 nm/PtMn 13.0 nm/Ta 5.0 nm. Therefore, the total thickness is 53.7 nm.

In the CIP head, 38% (48% in the CPP head) of the total thickness of the magnetoresistance effect film is PtMn. To have enough antiferromagnetic property, the thickness of PtMn must be 13 nm or more. Therefore, it is difficult to make the thin magnetoresistance effect film including PtMn. Namely, the thickness of the antiferromagnetic layer(s) is about 50% of the total thickness of the conventional magnetoresistance effect film, and it cannot be thinner than a prescribed thickness to have enough function, so that reducing the thickness of the magnetoresistance effect film is limited.

SUMMARY OF THE INVENTION

A first object of the present invention is to provide a magnetoresistance effect film capable of performing enough function without employing an antiferromagnetic layer.

A second object is to provide a magnetoresistance effect head having a narrow core width to realize high resolution.

To achieve the object, the present invention has following structures.

Namely, the magnetoresistance effect film comprises: a seed layer; a first pinned magnetic layer being formed on the seed layer; an antiferromagnetically coupling layer being formed on the first pinned magnetic layer; a second pinned magnetic layer being formed on the antiferromagnetically coupling layer; a nonmagnetic layer being formed on the second pinned magnetic layer; a free magnetic layer being formed on the nonmagnetic layer; and a protection layer being formed on the free magnetic layer, wherein the seed layer acts as a pinning layer, which fixes magnetizing directions of the first pinned magnetic layer and the second pinned magnetic layer, and the seed layer is made of a material which does not exchange-couple with the first pinned magnetic layer.

For example, the seed layer is made of tantalum (Ta) or an alloy including tantalum, and a difference between total magnetic moment of the first pinned magnetic layer and that of the second pinned magnetic layer is 0.7–1.4 T·nm.

And, the seed layer is made of tantalum (Ta) or an alloy including tantalum, and a value of a ratio "total magnetic moment of the first pinned magnetic layer" to "that of the second pinned magnetic layer" is 1.15–1.45.

Preferably, the seed layer is made of a nickel-chromium (NiCr) alloy or a nickel-iron-chromium (NiFeCr) alloy, concentration of nickel in the NiCr alloy or the NiFeCr alloy is 55–65 mol %, and a difference between total magnetic moment of the first pinned magnetic layer and that of the second pinned magnetic layer is 0.7–1.4 T·nm. And, the seed layer is made of a nickel-chromium (NiCr) alloy or a nickel-iron-chromium (NiFeCr) alloy, concentration of nickel in the NiCr alloy or the NiFeCr alloy is 55–65 mol %, and a value of a ratio "total magnetic moment of the first pinned magnetic layer" to "that of the second pinned magnetic layer" is 1.15–1.45.

For example, the seed layer has a first face and a second face, the first pinned magnetic layer is formed on the first face of the seed layer, and no antiferromagnetic layer or no ferrimagnetic layer is formed on the second face of the seed layer. The first pinned magnetic layer is made of a cobalt-iron (CoFe) alloy, in which concentration of cobalt is 35–71 mol %, or an alloy of cobalt-iron-a third element, in which concentration of cobalt is 35–71 mol %, and the product of saturation magnetization of the pinned magnetic layer and thickness thereof is 3–7 T·nm. The antiferromagnetically coupling layer is made of ruthenium (Ru), iridium (Ir), rhodium (Rh), chromium (Cr) or their alloy. And, a coercive force of the first pinned magnetic layer is 50 Oe or more.

The magnetoresistance effect head of the present invention comprises: a lower shielding layer; the magnetoresistance effect film of the present invention, which is formed on the lower shielding layer; and an upper shielding layer being formed on the magnetoresistance film.

Further, the magnetoresistance effect film of the present invention can be used in a solid state memory.

In the magnetoresistance effect film of the present invention, the seed layer, which acts as a pinning layer, is employed to fix the magnetizing directions of the first pinned magnetic layer and the second pinned magnetic layer instead of an antiferromagnetic layer. The seed layer can be much thinner than the antiferromagnetic layer, the magnetoresistance effect film can be effectively made thinner. Therefore, the core width and the gap-length of the magnetoresistance effect film can be shorter.

By employing the magnetoresistance effect film of the present invention, the magnetoresistance effect head can be used in a disk drive unit including recording media having high recording density.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings.

The feature of a magnetoresistance effect film of the present embodiment is a seed layer, which is formed as a base layer and which acts as a pinning layer for fixing the magnetizing direction of a pinned magnetic layer or layers instead of the conventional antiferromagnetic layer.

Figure 1:
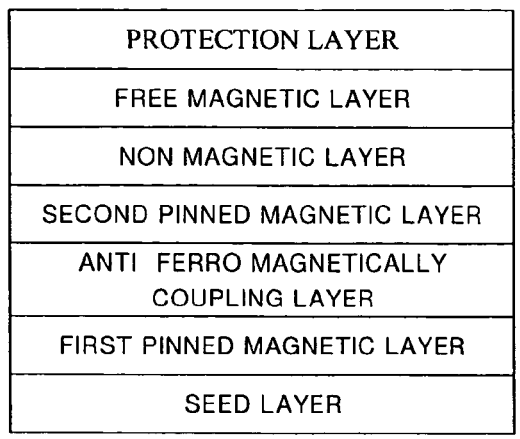
FIG. 1 is an explanation view showing a structure of the magnetoresistance effect film of the present invention.

As shown in FIG. 1, the magnetoresistance effect film of the present embodiment is constituted by: the seed layer; a first pinned magnetic layer; an antiferromagnetically coupling layer; a second pinned magnetic layer; a nonmagnetic layer; a free magnetic layer; and a protection layer.

Preferable materials of the seed layer is Ta, an alloy including Ta, a NiCr alloy and a NiFeCr alloy. Advantages of the materials will be explained.

Magnetic resistance characteristics (ρ-H) of magnetoresistance effect films, whose seed layers are made of different materials, are shown in FIGS. 2–7. The seed layers are formed as base layers of the first pinned magnetic layers, e.g., Co65Fe35. The structure of each magnetoresistance effect film is as follows: the seed layer 5.0 nm/Co65Fe35 2.0 nm/Ru 0.8 nm/CoFe 1.9 nm/Cu 1.9 nm/CoFe 1.0 nm/NiFe 2.0 nm/Ta 5.0 nm. Note that, in the present example, the layer of Co65Fe35 2.0 nm is the first pinned layer; the layer of Ru 0.8 nm is the antiferromagnetically coupling layer; the layer of CoFe 1.9 nm is the second pinned magnetic layer; the layer of Cu 1.9 nm is the nonmagnetic layer; the layers of CoFe 1.0 nm and NeFe 2.0 nm constitute the free magnetic layer; and the layer of Ta 5.0 nm is the protection layer.

Figure 2:
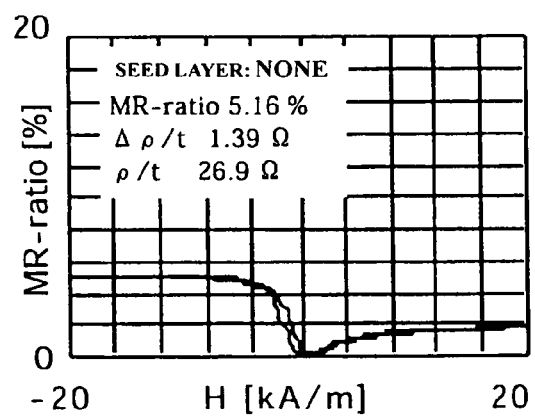
FIG. 2 is a graph showing MR-ratio of the magnetoresistance effect film including no seed layer.
Figure 3:
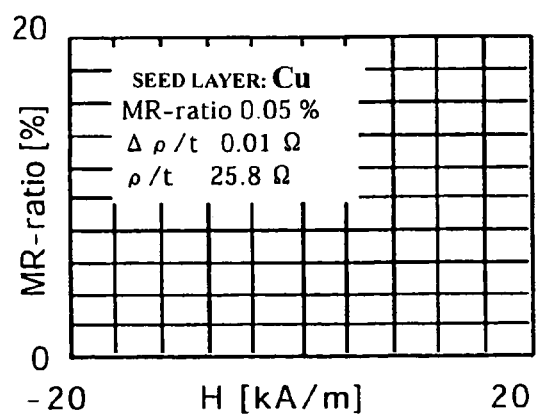
FIG. 3 is a graph showing the MR-ratio of the magnetoresistance effect film including a seed layer made of Cu.
Figure 4:
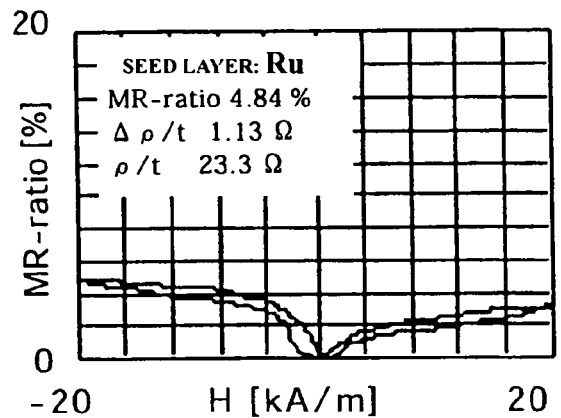
FIG. 4 is a graph showing the MR-ratio of the magnetoresistance effect film including the seed layer made of Ru.
Figure 5:
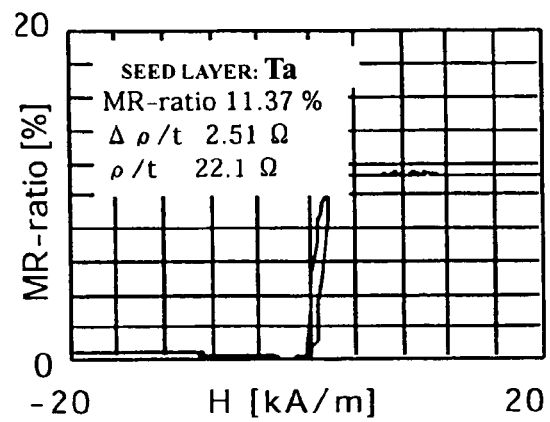
FIG. 5 is a graph showing the MR-ratio of the magnetoresistance effect film including the seed layer made of Ta.
Figure 6:
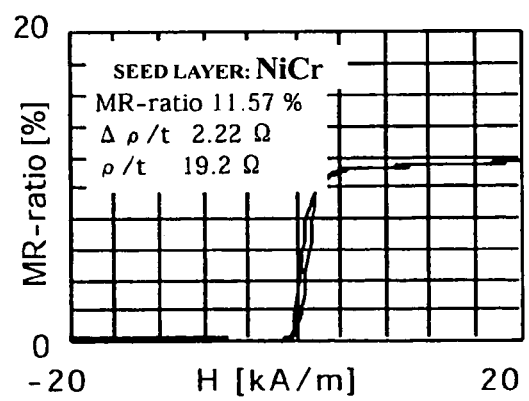
FIG. 6 is a graph showing the MR-ratio of the magnetoresistance effect film including the seed layer made of NiCr.
Figure 7:
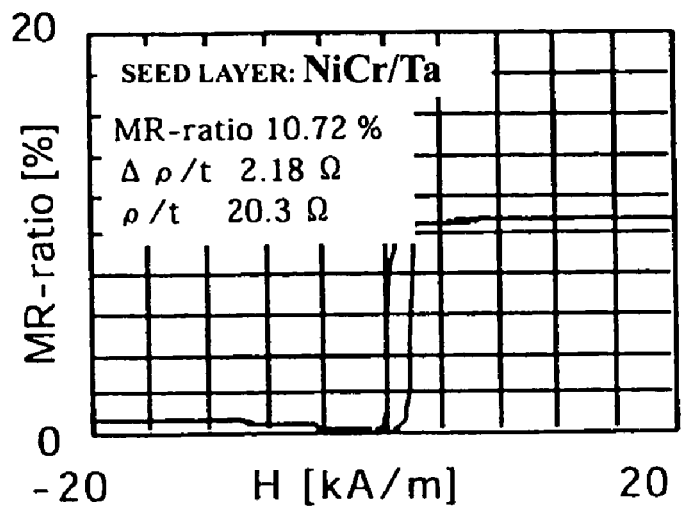
FIG. 7 is a graph showing the MR-ratio of the magnetoresistance effect film including the seed layer made of NiCr/Ta.

In the case of FIG. 2, no base layer is formed; in the case of FIG. 3, the base layer is made of Cu; in the case of FIG. 4, the base layer is made of Ru; in the case of FIG. 5, the base layer is made of Ta; in the case of FIG. 6, the base layer is made of NiCr; and in the case of FIG. 7, the base layer is constituted by NiCr/Ta (i.e., a NiCr layer and a Ta layer, whose thickness is 5.0 nm and which is formed on the NiCr layer).

According to the graphs of FIGS. 2–7, in the case of employing Ta and NiCr as materials of the base layer (the seed layer), the ρ-H characteristics have one-directional anisotropy. Rate of changing resistance is 11% or more. Total thickness of the magnetoresistance effect films are 19.6 nm, so they are 15 nm thinner than conventional films.

Another base layer made of a different material may be formed under the seed layer. As shown in FIG. 7, the ρ-H characteristics have one-directional anisotropy with the NiCr/Ta seed layer. Since the Ta seed layer contacts the first pinned magnetic layer, the one-directional anisotropy can be achieved even if another base layer (e.g., NiCr) is formed under the Ta seed layer. In the case of the seed layer made of NiCr, the same effects can be achieved.

Figure 8:
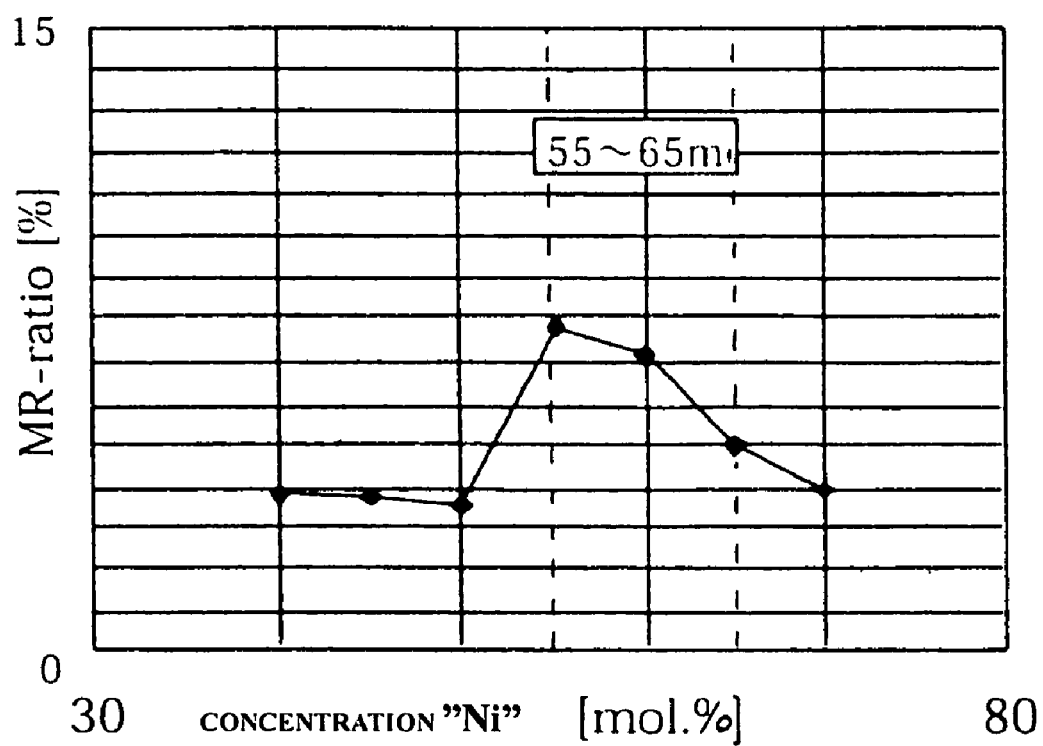
FIG. 8 is a graph showing ρ-H characteristics with respect to Ni concentration of NiCr of the seed layer.

FIG. 8 is a graph showing ρ-H characteristics with respect to Ni concentration of NiCr of the seed layer. High MR-ratio can be achieved when the Ni concentration is 55–65 mol %. Namely, in the case of employing NiCr as the seed layer, the preferred Ni concentration is 55–65 mol %. In the case of employing NiFeCr too, the preferred Ni concentration is 55–65 mol %.

Preferred Co concentration of the first pinned magnetic layer (CoFe) is 35–71 mol %. To improve magnetoresistance effect, a third metallic element, e.g., B, C, N, O, Si, V, Cr, Mn, Ni, Cu, Nb, Mo, Ru, Rh, Pd, Ta, W, Ir, Pt, may be added to the CoFe alloy of the first pinned magnetic layer. Further, an alloy including four metallic elements or more may be employed as the first pinned magnetic layer.

To increase the magnetoresistance effect, preferred Co concentration of the second pinned magnetic layer (CoFe) is about 90 mol %. Each of the first pinned magnetic layer and the second pinned magnetic layer may be formed by a plurality of CoFe layers, whose constitution are different, or a multilayered film made of a ternary alloy including CoFe, etc.

Figure 9:
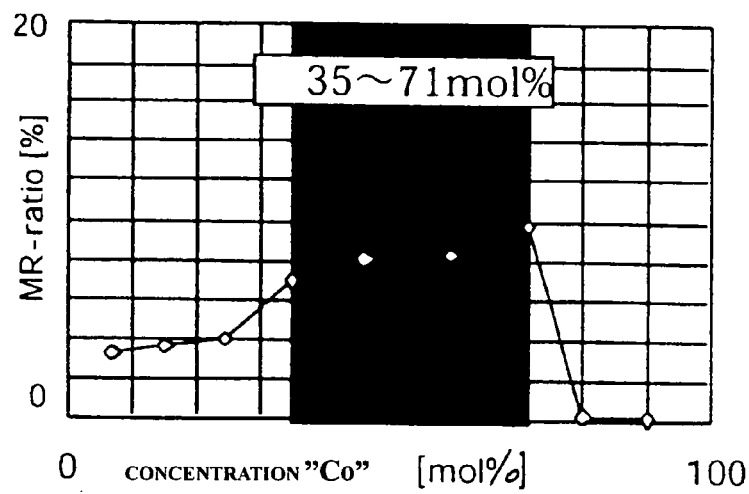
FIG. 9 is a graph showing magnetic resistance with respect to Co concentration of CoFe of a first pined magnetic layer.
Figure 10:
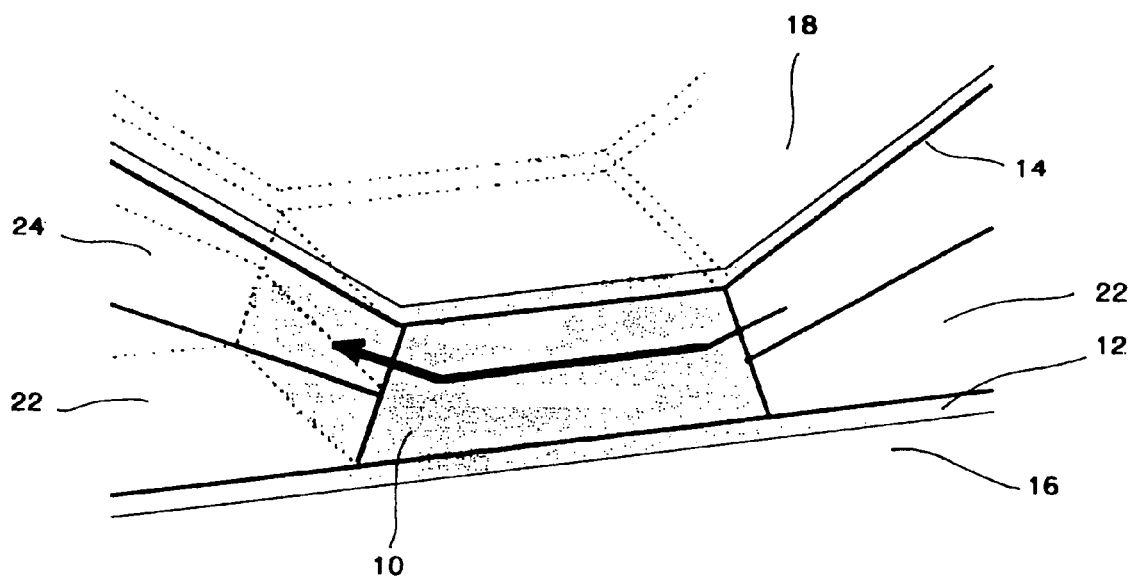
FIG. 10 is an explanation view showing a structure of the CIP type magnetoresistance effect film.
Figure 11:
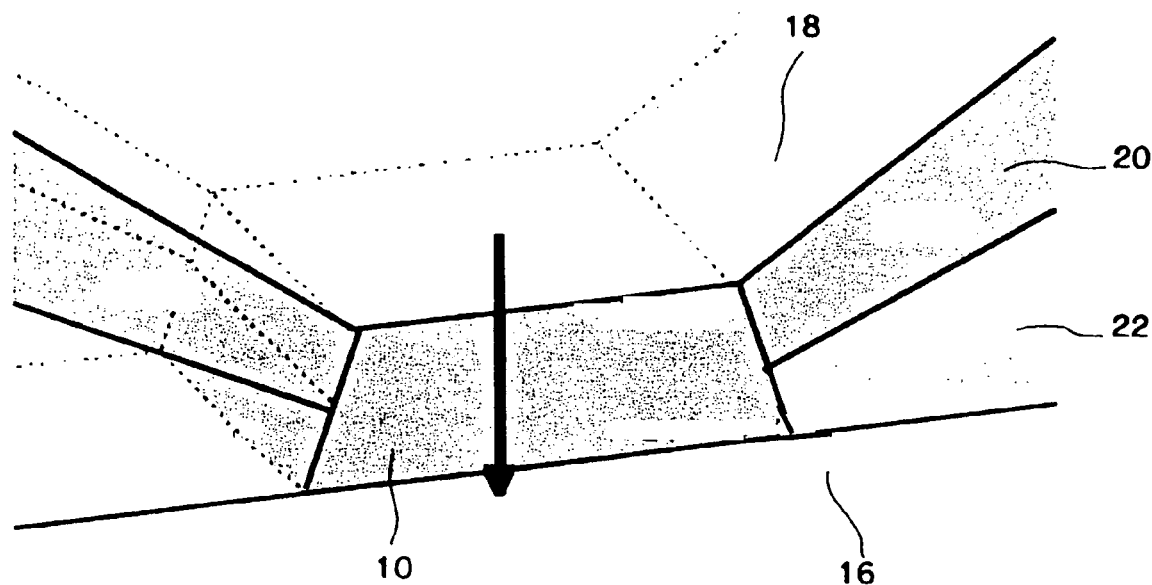
FIG. 11 is an explanation view showing a structure of the CPP type magnetoresistance effect film.

The first pinned magnetic layer, whose Co concentration is 35–71 mol %, will be explained. FIG. 9 is a graph showing magnetic resistance with respect to Co concentration of CoFe of the first pined magnetic layer. According to the graph, high MR-ratio can be achieved when the Co concentration is 35–71 mol % because one-directional anisotropy is increased within the Co concentration range.

Next, total magnetic moment of the first pinned magnetic layer and the second pinned magnetic layer will be explained. Magnetic moment is defined by the following formula:

(magnetic moment)=(saturation magnetization: $Bs$)×(thickness of magnetic layer: $tmag$)−(thickness of magnetic dead layer: $tdead$)

Note that, the "$tmag$" is a physical thickness of the magnetic layer; and the "$tdead$" is a range (e.g., 0–2 nm) from a boundary face between the magnetic layer and a nonmagnetic layer wherein magnetism is lost.

The total magnetic moment is the sum of the magnetic moment of layers.

In the present embodiment, a difference between the total magnetic moment of the first pinned magnetic layer and that of the second pinned magnetic layer is 0.7–1.4 T·nm, or a value of a ratio "the total magnetic moment of the first pinned magnetic layer" to "that of the second pinned magnetic layer" [i.e., (the total magnetic moment of the first pinned magnetic layer)/(the total magnetic moment of the second pinned magnetic layer)] is 1.15–1.45.

Magnetic characteristics with respect to the total magnetic moment are shown in TABLE 1.

TABLE 1

| TOTAL MAGNETIC MOMENT [Tnm] | | | | | ONE- |
|---|---|---|---|---|---|
| FIRST PINNED MAGNETIC LAYER | SECOND PINNED MAGNETIC LAYER | DIFFER-ENCE | MO-MENT RATIO | MR-RATIO | DIREC-TIONAL ANISOT-ROPY |
| 4.40 | 3.23 | 1.17 | 1.362 | 9.47 | o |
| 3.96 | 3.23 | 0.73. | 1.226 | 3.04 | o |
| 4.40 | 3.57 | 0.83 | 1.232 | 4.70 | o |
| 3.96 | 2.89 | 1.07 | 1.370 | 9.12 | o |
| 4.84 | 3.57 | 1.27 | 1.356 | 9.13 | o |
| 5.28 | 3.91 | 1.37 | 1.350 | 9.00 | o |
| 4.84 | 3.23 | 1.61 | 1.498 | 9.66 | x |
| 5.28 | 3.23 | 2.05 | 1.653 | 9.65 | x |
| 5.72 | 3.23 | 2.49 | 1.771 | 9.60 | x |
| 6.16 | 3.23 | 2.93 | 1.907 | 9.30 | x |
| 2.64 | 3.23 | −0.59 | 0.817 | 0.00 | x |
| 3.08 | 3.23 | −0.15 | 0.954 | 0.00 | x |
| 3.52 | 3.23 | 0.29 | 1.090 | 0.00 | x |
| 4.40 | 3.91 | 0.49 | 1.125 | 3.26 | x |
| 4.40 | 4.25 | 0.15 | 1.035 | 4.88 | x |
| 4.40 | 4.59 | −0.19 | 0.959 | 6.34 | x |
| 4.40 | 2.89 | 1.51 | 1.522 | 9.81 | x |
| 4.40 | 2.55 | 1.85 | 1.725 | 9.87 | x |
| 4.40 | 2.21 | 2.19 | 1.991 | 9.73 | x |

When the difference is 0.73–1.37 T·nm and the total moment ratio is 1.15–1.45, the one-directional anisotropy is observed. The difference and the ratio will be explained.

In the magnetoresistance effect film of the present embodiment, the one-directional anisotropy is caused by exchange coupling between the seed layer and the first pinned magnetic layer. In the case that the difference (positive number) is great (for example, the total magnetic moment of the first pinned magnetic layer is great), if the exchange couple is fixed, a pinning field working to the first pinned magnetic layer is in inversely proportion to the total magnetic moment of the first pinned magnetic layer, so that the one-directional anisotropy is weakened.

On the other hand, the difference 0.7 or less, the second pinned magnetic layer is exchange-coupled with the first pinned magnetic layer via the antiferromagnetically coupling layer, so that its magnetizing direction is fixed. Therefore, if the difference is small (for example, the total magnetic moment of the second pinned magnetic layer is great), the pinning field from the first pinned magnetic layer is in inversely proportion to the total magnetic moment of the first pinned magnetic layer, so that the one-directional anisotropy is weakened as well. According to experiments, the preferred range of the difference is 0.7–1.4 T·nm.

Further, the preferred range of the difference can be indicated by the ratio "the total magnetic moment of the first pinned magnetic layer" to "that of the second pinned magnetic layer". According to experiments, the preferred range of the ratio is 1.15–1.45.

The ρ-H characteristics of the magnetoresistance effect film, in which the first pinned magnetic layer is made of CoFeRu), with respect to Ru are shown in TABLE 2.

TABLE 2

| MOL-RATIO[at %] | | | | |
|---|---|---|---|---|
| $C_{CO}$ | $C_{Fe}$ | $C_{RU}$ | MR-RATIO | $ÄR_S[Ù]$ |
| 63.2 | 36.8 | 0.0 | 10.99 | 2.745 |
| 62.5 | 36.5 | 1.0 | 11.68 | 2.738 |
| 61.9 | 36.1 | 2.0 | 11.86 | 2.804 |
| 60.7 | 35.4 | 3.9 | 12.39 | 2.958 |
| 58.4 | 34.1 | 7.6 | 13.02 | 3.133 |
| 56.3 | 32.8 | 10.9 | 13.54 | 3.271 |
| 54.3 | 31.7 | 14.1 | 13.77 | 3.338 |
| 52.4 | 30.6 | 17.0 | 14.00 | 3.450 |
| 50.7 | 29.6 | 19.7 | 14.21 | 3.505 |
| 49.1 | 28.6 | 22.3 | 14.45 | 3.482 |
| 47.6 | 27.8 | 24.7 | 14.41 | 3.496 |
| 46.2 | 26.9 | 26.9 | 14.07 | 3.389 |
| 44.8 | 26.1 | 29.0 | 13.66 | 3.303 |

Note that, the thickness of the second pinned magnetic layer was adjusted so as to make the difference of the total magnetic moments 0.9–1.2 T·nm.

According to the TABLE 2, the MR-ratio and resistance variation ΔRs are increased by adding Ru to the first pinned magnetic layer. Resistivity of the Cofe alloy is small, e.g., 20 μΩcm, so a part of a sensing current passes through the first pinned magnetic layer, which does not contribute to the magnetoresistance effect. Therefore, loss of shunt effect occurs. On the other hand, by adding Ru to the first pinned magnetic layer (CoFe), the resistivity can be increased to 50 μΩcm, so that the shunt effect can be weakened and the magnetoresistance effect can be improved. This effect can be achieved by adding other metallic elements, e.g., B, C, N, O, Si, V, Cr, Mn, Ni, Cu, Nb, Mo, Rh, Pd, Ta, W, Ir, Pt, to the CoFe alloy.

The magnetoresistance effect film can be used in the CPP type head. In this case too, an antiferromagnetic layer can be omitted, so that the core width and the gap-length can be shorter as well as the CIP type head.

The magnetoresistance effect film of the present embodiment can be used in a solid state memory, e.g., MRAM. By using the magnetoresistance effect film, a memory element whose size is 0.1 μm or less can be realized as well as the head element, so that capacity of the solid sate memory can be increased.

Further, the structure of the magnetoresistance effect film of the present embodiment can be applied to a dual spin valve film so as to improve the magnetoresistance effect. A structure of an ordinary dual spin valve film is, for example, NiCr 5.0 nm/PtMn 13.0 nm/CoFe 1.5 nm/Ru 0.8 nm/CoFe 2.3 nm/Cu 2.0 nm/CoFe 1.0 nm/NiFe 2.0 nm/CoFe 1.0 nm/Cu 2.0 nm/CoFe 2.3 nm/Ru 0.8 nm/CoFe 2.0 nm/PtMn 13.0 nm/Ta 5.0 nm. Therefore, the total thickness is 53.7 nm.

Figure 14:
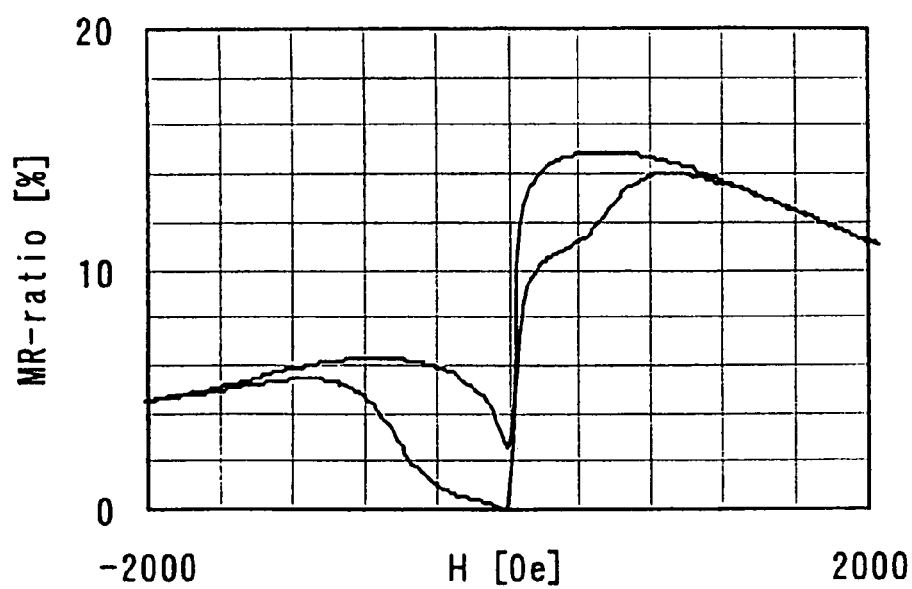
FIG. 14 is a graph showing ρ-H characteristics of a dual spin valve film.
Figure 12A:
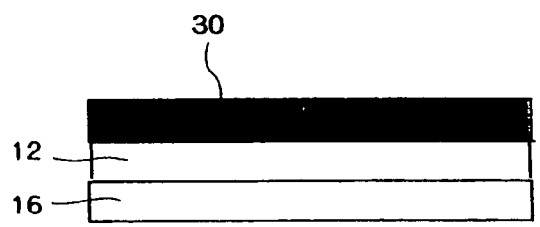
FIGS. 12A–12F are explanation views showing the method of manufacturing the CIP type magnetoresistance effect head.
Figure 12B:
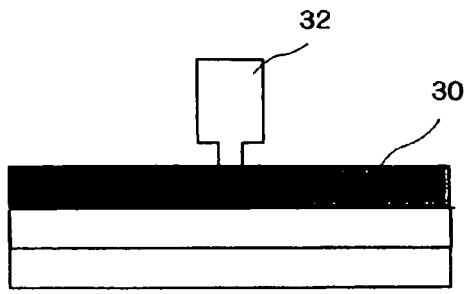
Figure 12C:
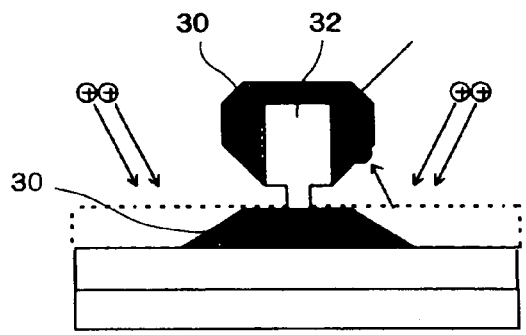
Figure 12D:
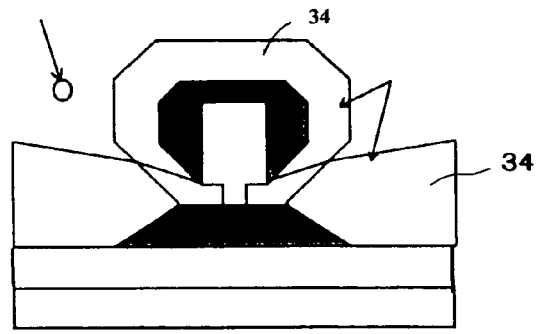
Figure 12E:
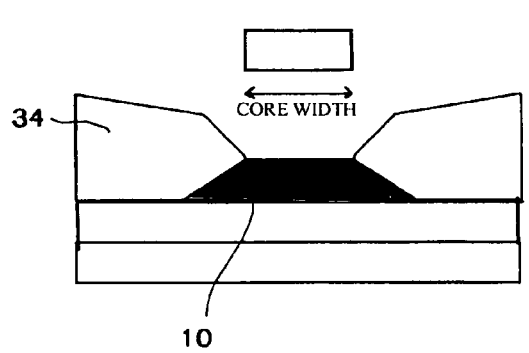
Figure 12F:
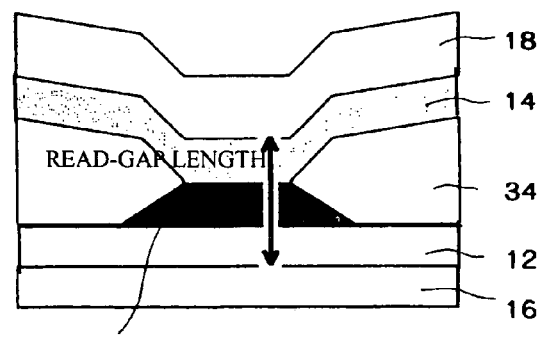
Figure 13A:
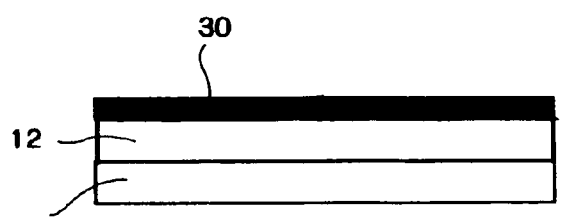
FIGS. 13A–13F are explanation views showing the method of manufacturing the CIP type magnetoresistance effect head with the thin magnetoresistance effect film.
Figure 13B:
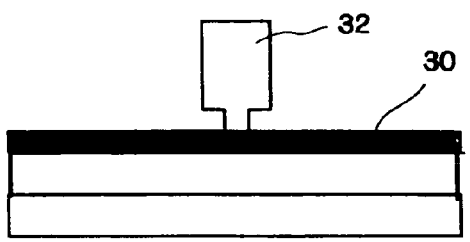
Figure 13C:
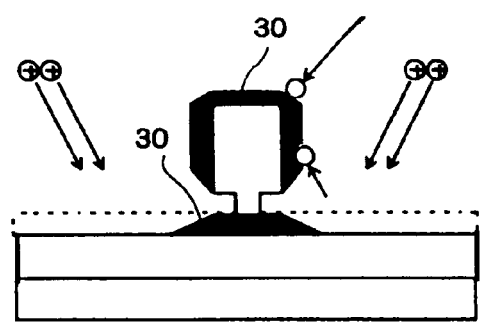
Figure 13D:
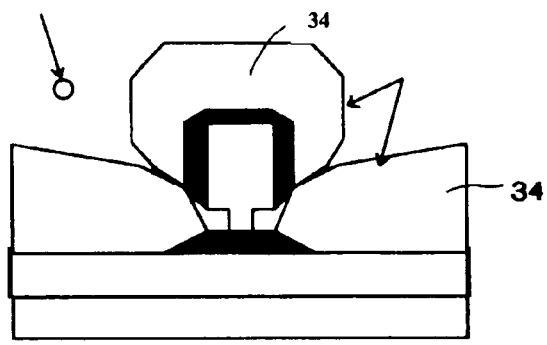
Figure 13E:
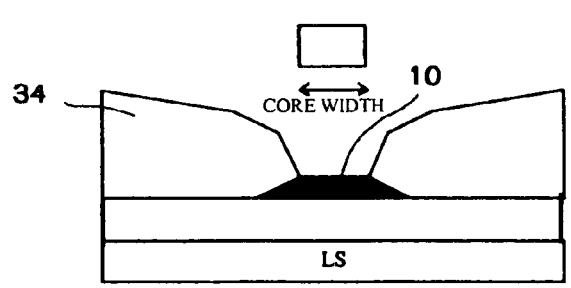
Figure 13F:
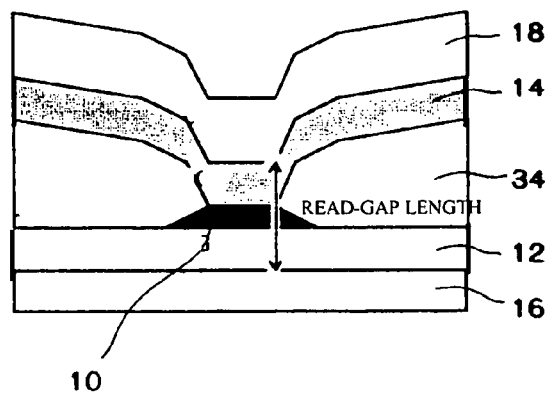

On the other hand, a structure of the dual spin valve film of the present embodiment is, for example, Ta 5.0 nm/$Co_{65}Fe_{35}$ 2.0 nm/Ru 0.8 nm/CoFe 1.9 nm/Cu 2.0 nm/CoFe 1.0 nm/NiFe 2.0 nm/CoFe 1.0 nm/Cu 2.0 nm/CoFe 1.9 nm/Ru 0.8 nm/$Co_{65}Fe_{35}$ 2.0 nm/Ta 5.0 nm. Therefore, the total thickness is 35.3 nm. Namely, 35% of the thickness can be reduced with respect to the ordinary film. The ρ-H characteristics of the dual spin valve film are shown in FIG. 14. According to FIG. 14, the MR-ratio is increased from 12% to 15%, and an output power is 20% increased.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A magnetoresistance effect film,
comprising:
a seed layer;
a first pinned magnetic layer being formed on said seed layer;
an antiferromagnetically coupling layer being formed on said first pinned magnetic layer;
a second pinned magnetic layer being formed on said antiferromagnetically coupling layer;
a nonmagnetic layer being formed on said second pinned magnetic layer;
a free magnetic layer being formed on said nonmagnetic layer; and
a protection layer being formed on said free magnetic layer,
wherein said seed layer acts as a pinning layer, which fixes magnetizing directions of said first pinned magnetic layer and said second pinned magnetic layer, and
said seed layer is made of a material which does not exchange-couple with said first pinned magnetic layer.

2. The magnetoresistance effect film according to claim 1, wherein said seed layer is made of tantalum (Ta) or an alloy including tantalum, and
a difference between total magnetic moment of said first pinned magnetic layer and that of said second pinned magnetic layer is 0.7–1.4 T·nm.

3. The magnetoresistance effect film according to claim 1, wherein said seed layer is made of tantalum (Ta) or an alloy including tantalum, and
a value of a ratio "total magnetic moment of said first pinned magnetic layer" to "that of said second pinned magnetic layer" is 1.15–1.45.

4. The magnetoresistance effect film according to claim 1, wherein said seed layer is made of a nickel-chromium (NiCr) alloy or a nickel-iron-chromium (NiFeCr) alloy, concentration of nickel in the NiCr alloy or the NiFeCr alloy is 55–65 mol %, and a difference between total magnetic moment of said first pinned magnetic layer and that of said second pinned magnetic layer is 0.7–1.4 T·nm.

5. The magnetoresistance effect film according to claim 1, wherein said seed layer is made of a nickel-chromium (NiCr) alloy or a nickel-iron-chromium (NiFeCr) alloy, concentration of nickel in the NiCr alloy or the NiFeCr alloy is 55–65 mol %, and a value of a ratio "total magnetic moment of said first pinned magnetic layer" to "that of said second pinned magnetic layer" is 1.15–1.45.

6. The magnetoresistance effect film according to claim 1, wherein said seed layer has a first face and a second face, said first pinned magnetic layer is formed on the first face of said seed layer, and no antiferromagnetic layer or no ferrimagnetic layer is formed on the second face of said seed layer.

7. The magnetoresistance effect film according to claim 6, wherein said first pinned magnetic layer is made of a cobalt-iron (CoFe) alloy, in which concentration of cobalt is 35–71 mol %, or an alloy of cobalt-iron-a third element, in which concentration of cobalt is 35–71 mol %, and the product of saturation magnetization of said pinned magnetic layer and thickness thereof is 3–7 T·nm.

8. The magnetoresistance effect film according to claim 6, wherein said antiferromagnetically coupling layer is made of ruthenium (Ru), iridium (Ir), rhodium (Rh), chromium (Cr) or their alloy.

9. The magnetoresistance effect film according to claim 1, wherein a coersive force of said first pinned magnetic layer is 50 Oe or more.

10. A magnetoresistance effect head, comprising:
a lower shielding layer;
a magnetoresistance effect film being formed on said lower shielding layer; and
an upper shielding layer being formed on said magnetoresistance film,
wherein said magnetoresistance effect film includes:
  a seed layer;
  a first pinned magnetic layer being formed on said seed layer;
  an antiferromagnetically coupling layer being formed on said first pinned magnetic layer;
  a second pinned magnetic layer being formed on said antiferromagnetically coupling layer;
  a nonmagnetic layer being formed on said second pinned magnetic layer;
  a free magnetic layer being formed on said nonmagnetic layer;
  a protection layer being formed on said free magnetic layer;
  a bias layer; and
  terminal layers,
said seed layer acts as a pinning layer, which fixes magnetizing directions of said first pinned magnetic layer and said second pinned magnetic layer, and
said seed layer is made of a material which does not exchange-couple with said first pinned magnetic layer.

11. A solid state memory including a magnetoresistance effect film, which comprises:
a seed layer;
a first pinned magnetic layer being formed on said seed layer;
an antiferromagnetically coupling layer being formed on said first pinned magnetic layer;
a second pinned magnetic layer being formed on said antiferromagnetically coupling layer;
a nonmagnetic layer being formed on said second pinned magnetic layer;
a free magnetic layer being formed on said nonmagnetic layer; and
a protection layer being formed on said free magnetic layer,
wherein said seed layer acts as a pinning layer, which fixes magnetizing directions of said first pinned magnetic layer and said second pinned magnetic layer, and
said seed layer is made of a material which does not exchange-couple with said first pinned magnetic layer.

12. A magnetoresistance effect film, comprising:
a seed layer;
a first pinned magnetic layer being formed on said seed layer;
a first antiferromagnetically coupling layer being formed on said first pinned magnetic layer;
a second pinned magnetic layer being formed on said first antiferromagnetically coupling layer;
a first nonmagnetic layer being formed on said second pinned magnetic layer;
a free magnetic layer being formed on said first nonmagnetic layer;
a second nonmagnetic layer being formed on said free magnetic layer;
a third pinned magnetic layer being formed on said second nonmagnetic layer;
a second antiferromagnetically coupling layer being formed on said third pinned magnetic layer;
a fourth pinned magnetic layer being formed on said second antiferromagnetically coupling layer; and
a protection layer being formed on said fourth pinned magnetic layer,
wherein said seed layer acts as a pinning layer, which fixes magnetizing directions of said first pinned magnetic layer and said second pinned magnetic layer, and
said seed layer is made of a material which does not exchange-couple with said first pinned magnetic layer.

* * * * *